Oct. 31, 1950 E. E. HOOD 2,528,309
BACK PEDALING BRAKE FOR VELOCIPEDES
Filed Feb. 20, 1948
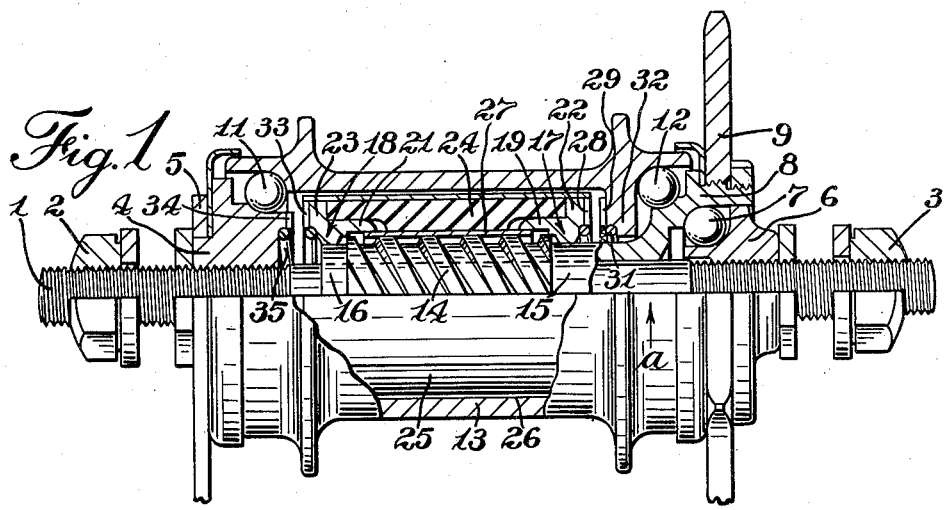
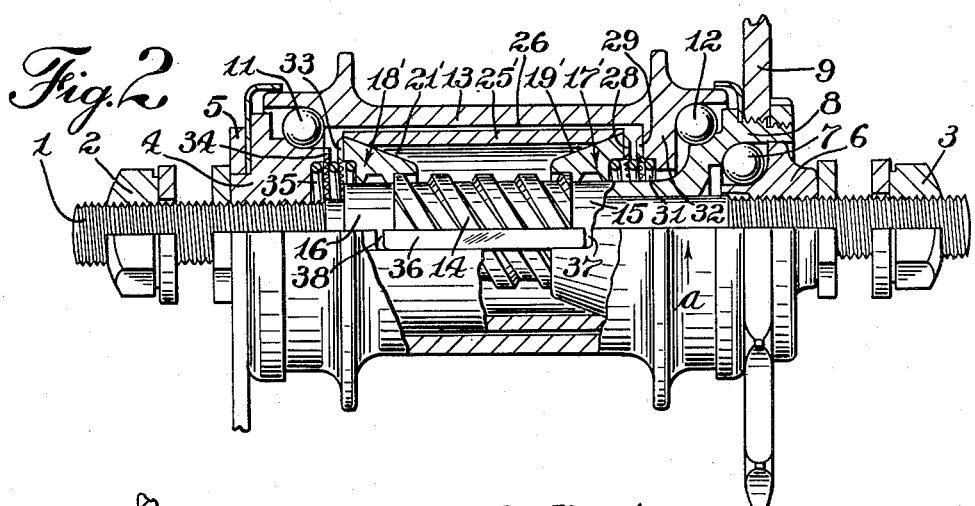
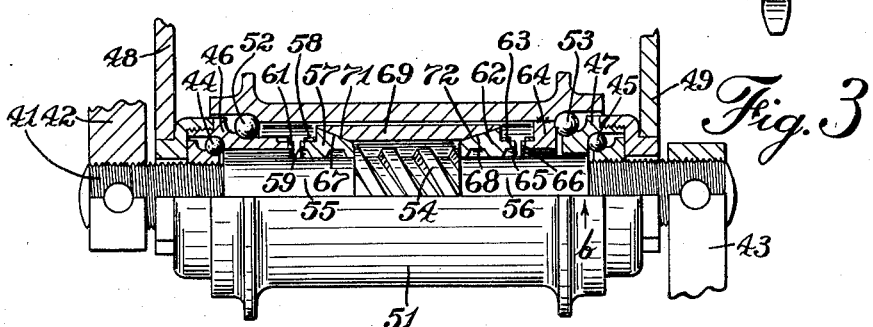
WITNESS:
Esther M. Stockton
INVENTOR.
E. Elliott Hood
BY
Clinton S. Janes
ATTORNEY Patented Oct. 31, 1950

2,528,309

UNITED STATES PATENT OFFICE 2,528,309

BACK PEDALING BRAKE FOR VELOCIPEDES

Edwin Elliott Hood, Elmira, N. Y., assignor to Bendix Aviation Corporation, Elmira Heights, N. Y., a corporation of Delaware Application February 20, 1948, Serial No. 9,927

1 Claim. (Cl. 192—6)

The present invention relates to back pedalling brakes for velocipedes, and more particularly to internally expanding hub brakes therefor.

It is an object of the present invention to provide a novel coaster brake which is efficient and reliable in operation, and simple and economical in construction.

It is another object to provide such a device in which the same elements serve to perform both the driving and braking functions under the control of a unitary actuating member.

It is another object to provide such a device including threaded actuating means, the parts of which are interchangeable so as to reduce the total number of different parts required.

It is another object to provide such a device in which substantially the entire available surface of the interior of the hub is utilized for both the braking and driving functions, so that the brake operates efficiently and wears slowly and uniformly.

Further objects and advantages will be apparent from the following description taken in connection with the accompanying drawing in which:

Fig. 1 is a side elevation partly broken away and in section of a preferred embodiment of the invention;

Fig. 2 is a similar view showing a second embodiment of the invention; and

Fig. 3 is a similar view of an embodiment of the invention adapted to be employed in a crank hanger brake.

In Fig. 1 of the drawing there is illustrated a fixed axle 1 which is arranged to be clamped in the forks of the frame of a velocipede, not illustrated, by means of the clamp nuts 2 and 3 threaded thereon. An anchor member 4 is also threaded on one end of the axle 1 and is prevented from rotation by an anchor arm 5 which is non-rotatably connected thereto, and is arranged to have its free end attached to the frame of the vehicle in the conventional manner.

A bearing cone 6 is threaded on the opposite end of the axle 1 and is arranged to cooperate with ball bearings 7 to form a support for an actuating member 8. Said actuating member is formed as a hollow threaded shaft rotatably mounted on the axle 1, having a drive sprocket 9 fixed thereon. The anchor member 4 and the actuating member 8 are provided with bearing cone surfaces adapted to cooperate with bearing balls 11 and 12 respectively which rotatably support the opposite ends of a cylindrical hub member 13.

The actuating member 8 is threaded for a portion of its length as indicated at 14 and has smooth cylindrical portions 15 and 16 adjacent the ends of the threaded portion. A pair of nut members 17 and 18 are mounted on the actuating member and arranged to cooperate with the threaded portion 14 thereof. The nuts 17, 18 are provided with cylindrical portions 19, 21 respectively, and flanges 22 and 23 respectively, and a cylindrical member 24 of elastically deformable material such as rubber is arranged to rest at its ends on the cylindrical portions 19, 21 and abut against the flanges 22, 23. An expansible cylindrical brake member 25 of suitable material such as brass or bronze is mounted at its ends on the flanges 22, 23 of the nut members 17, 18. The brake member surrounds the elastic member 24 so as to be expanded thereby when the elastic member is compressed between the nut members, and is thereby moved into frictional engagement with the inner cylindrical surface 26 of the hub 13. A sleeve 27 is preferably located within the elastic member 24, in slidable engagement with the cylindrical portions 19, 21 of the nut members 17, 18 in order to prevent the elastic member from coming into contact with the threaded portion 14 of the actuating member 8.

The nut 17 is provided with clutch teeth 28 arranged to engage similar clutch teeth 29 on a flange 32 in the hub 13 when the nut 17 has run off the end of the threaded portion 14 of the actuating member. A spring 31 is located between the nut 17 and the flange 32 and serves to urge the nut member toward the threaded portion 14 of the actuating member. Spring 31 also provides a light frictional drag connection between the nut 17 and the hub 13.

The nut 18 is provided with clutch teeth 33 arranged to engage similar clutch teeth 34 on the anchor member 4 when said nut has run off the end of the threaded portion 14 of the actuating member. A spring 35 is located between the nut 18 and the anchor member to provide a frictional drag connection between these parts. It also serves to urge the nut 18 into initial engagement with the threaded portion 14 of the actuating member.

In the operation of this embodiment of the invention, rotation of the actuating member 8 in the forward driving direction indicated by the arrow a causes the nut 18 to thread itself to the right on the threaded portion of the actuating member thus moving the elastic member 24 and nut 17 to the right until the clutch teeth 28 of nut 17 engage the clutch teeth 29 of the hub 13. Further forward rotation of the actuating member causes the nut 18 to compress the elastic member 24 so as to expand the cylinder 25 into engagement with the interior of the hub 13 whereupon the hub is clutched to the actuating member and caused to rotate therewith. When the rotation of the actuating member 8 is stopped by the operator, the forward rotation of the hub 13 causes the nut 17 to overrun the actuating member whereby the nut 17, elastic member 24 and nut 18 are traversed back to their original position as illustrated. Backward rotation of the actuating member by the operator causes the nut 17 to enter the threaded portion 14 of the actuating member thereby traversing the elastic member 24 and nut 18 further to the left until the clutch teeth 33 of the nut engage the clutch teeth 34 on the anchor member thereby immobilizing the nut 18. Further backward rotation of the actuating member 8 causes the nut 17 to compress the elastic member 24, thus expanding the cylinder 25 into frictional engagement with the interior of the hub 13, thereby retarding the rotation of the hub. It would be understood that the initial traversal of the nuts 17 and 18 for driving and braking purposes is assured by the frictional drag of the springs 31, 35 respectively, while the entry of the nuts on the threaded portion 14 is likewise assured by the expansive force of the said springs.

In the embodiment of the invention illustrated in Fig. 2 cone expanding means for the brake and drive member are substituted for the elastic expanding means 24 of Fig. 1. For this purpose, the nuts 17' and 18' are formed with conical surfaces 19' and 21' adapted to cooperate with an expansible sleeve 25' which is brought thereby into frictional engagement with the interior of the hub 13. The remaining parts of the brake are the same as illustrated in Fig. 1, and are similarly numbered, and the operation of the brake is the same.

In this embodiment it may be deemed desirable to positively prevent relative rotation between the nut members 17', 18' and the expanding sleeve 25'. This may conveniently be accomplished by means of one or more key members 36 interposed between the sections of the expansible sleeve 25' having loose sliding engagement at their ends in recesses 37, 38 in the nut members 17', 18'.

In Fig. 3 there is illustrated a crank hanger brake utilizing the principles of the structure shown more particularly in Fig. 2. As there illustrated, a driving axle 41 having cranks 42 and 43 suitably fixed on the ends thereof is rotatably mounted by means of bearings 44 and 45 in bearing members 46 and 47 adapted to be fixedly mounted in the frame members 48, 49 of the vehicle. A cylindrical wheel hub 51 is rotatably mounted at its ends on the bearing members 46, 47 by means of bearings 52, 53.

The axle 41 is provided with centrally threaded portion 54 and smooth cylindrical portions 55 and 56 adjacent thereto. A nut 57 is mounted on the smooth portion 55 of the axis, and is urged toward the threaded portion 54 by means of a detent spring 58 frictionally bearing on the adjacent ends of the nut 57 and the bearing member 46. The adjacent portions of said nut and bearing member are provided with clutch teeth 59 and 61 respectively, and the spring 58 serves to normally maintain these clutch teeth disengaged.

A nut 62 is mounted on the smooth portion 56 of the axle and is urged toward the threaded portion 54 by a detent spring 63 which bears frictionally on the nut 62 and on a clutch member 64 fixed to the interior of the hub 51 in any suitable manner, as by brazing. The adjacent portions of the nut 62 and clutch member 64 are provided with clutch teeth 65 and 66 respectively.

The nuts 57, 62 are provided with conical surfaces 67 and 68, and an expansible sleeve 69 is provided at its ends with corresponding conical surfaces 71 and 72 adapted to seat thereon whereby movement of the nuts toward each other causes the sleeve 69 to be cammed out into frictional engagement with the interior of the hub 51. The sleeve 69 may be in the form of a slotted cylinder, or may be formed as a plurality of segments in order to facilitate the expansion of the sleeve by the nuts.

On the operation of this embodiment of this invention, forward rotation of the axle 41 in the direction of the arrow b by the cranks 42, 43 causes the nut 57 to be threaded on the portion 54 of the axle, thus moving the sleeve 69 and the nut 62 to the right until the nut 62 is clutched to the clutch member 64 and thereby non-rotatably connected to the hub. Further forward rotation of the axle causes the sleeve 69 to be expanded into engagement with the hub 51 to thereby transmit the rotation of the axle to the hub. When rotation of the axle ceases, the further rotation of the hub causes the nut 57 to be threaded off from the portion 54 of the axle whereby the hub is free to overrun. Backward rotation of the axle causes the nut 62 to thread itself on the portion 54 of the axle and thereby move the sleeve 69 with nut 57 to the left until the nut 57 is clutched to the bearing member 46 and thereby immobilized. Further backward rotation of the axle causes the sleeve 69 to be expanded into frictional engagement with the hub 51 to thereby retard its rotation. The springs 58 and 63 insure traversal of the nut members 57 and 62 respectively by virtue of the frictional drag of the springs, and further serve by their expansive force to cause the nuts to enter upon the threaded portion 54 of the axle when the axle is rotated in the proper direction.

Although certain embodiments of the invention have been shown and described in detail, it will be understood that other embodiments are possible and that various changes may be made in the design and arrangement of the parts without departing from the spirit of the invention.

I claim:

In a back-pedalling brake for velocipedes, an actuating shaft having a threaded portion with a smooth portion adjacent each end of the threaded portion, a nut member slidably journalled on each smooth portion of the shaft and having internal threads adapted to mate with the threads of the shaft, a rotatably mounted wheel hub having an internal cylindrical surface surrounding the shaft and nuts, an expansible cylindrical member slidably mounted on said nuts, a fixed abutment for one of said nuts limiting the travel thereof away from the threaded portion of the shaft and having clutch means cooperating therewith to immobilize said nut when engaged therewith after disengaging from said threaded portion, an abutment in said hub for the other of said nuts limiting the travel thereof away from the threaded portion of the shaft and having clutch means cooperating therewith to lock said other nut to the hub when engaged therewith after disengagement from the threads of the actuating shaft, springs located between each of said nuts and its abutment forming a frictional coupling therebetween and also serving to cause the nut to enter upon the threads of the shaft when said shaft is rotated in the proper direction, and means actuated by compression between the nuts for expanding said cylindrical member into frictional engagement with the interior of the hub.

E. ELLIOTT HOOD.

REFERENCES CITED

The following references are of record in the file of this patent:

UNITED STATES PATENTS

| Number | Name | Date |
|---|---|---|
| 719,118 | Hurck | Jan. 27, 1903 |
| 803,250 | Smith | Oct. 31, 1905 |
| 1,648,421 | Olsen | Nov. 8, 1927 |
| 2,423,070 | Sayles | June 24, 1947 |

FOREIGN PATENTS

| Number | Country | Date |
|---|---|---|
| 357,186 | France | Dec. 20, 1905 |